Patented Aug. 11, 1953

2,648,673

UNITED STATES PATENT OFFICE 2,648,673

N-THIO PYRROLIDINES

Thomas E. Lesslie, Nitro, W. Va., assignor to Monsanto Chemical Company, St. Louis, Mo., a corporation of Delaware No Drawing. Application October 10, 1950, Serial No. 189,485

7 Claims. (Cl. 260—313)

1

This invention relates to a new class of chemical compounds, namely sulfides of five membered saturated heterocyclic mono nitrogen compounds. More particularly it relates to sulfides of pyrrolidines. These compounds are valuable intermediates, vulcanizing agents for elastomers, and adjuvants for mineral oil lubricating compositions.

The compounds of this invention contain the nucleus

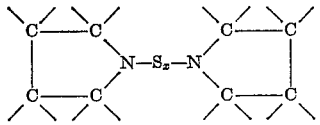

where $x$ is an integer. The valences of the carbon atoms may be satisfied by hydrogen, organic substituents or halogen.

These compounds may be prepared by the action of sulfur halides on pyrrolidines. The monosulfides are formed by condensing two mols of the pyrrolidine with one of sulfur dichloride. Substitution of sulfur monochloride for the dichloride results in the formation of disulfides. The latter combine with more sulfur to produce higher sulfides. For example, a tetrasulfide is formed by heating one molecular proportion of an N,N'-dithio pyrrolidine and two atomic weight proportions of sulfur. The higher sulfides may be mixtures of compounds containing different ratios of sulfur and are therefore of somewhat indefinite composition. However, it is possible to prepare a composition which by analysis indicates that four atoms of sulfur link two of the amino radicals.

Typical examples of the new compounds and typical methods of preparation are set forth to illustrate the invention but it is to be understood that the invention is not limited thereto.

N,N'-thio-bis-alpha-methyl pyrrolidine
N,N'-dithio-bis-alpha-methyl pyrrolidine
N,N'-trithio-bis-alpha-methyl pyrrolidine
N,N'-tetrathio-bis-alpha-methyl pyrrolidine
N,N'-thio-bis-beta-methyl pyrrolidine
N,N'-dithio-bis-beta-methyl pyrrolidine
N,N'-thio-bis-alpha-beta-dimethyl pyrrolidine
N,N'-dithio-bis-alpha-beta-dimethyl pyrrolidine
N,N'-thio-bis-alpha-alpha'-dimethyl pyrrolidine
N,N'-dithio-bis-alpha-alpha'-dimethyl pyrrolidine
N,N'-dithio-bis-alpha-beta'-dimethyl pyrrolidine
N,N'-thio-bis-alpha-ethyl pyrrolidine
N,N'-dithio-bis-alpha-ethyl pyrrolidine
N,N'-trithio-bis-alpha-ethyl pyrrolidine
N,N'-tetrathio-bis-alpha-ethyl pyrrolidine

2

N,N'-dithio-bis-alpha-alpha'-beta-trimethyl pyrrolidine
N,N'-dithio-bis-beta-beta'-dimethyl-alpha-alpha'-dimethyl pyrrolidine
N,N'-dithio-bis-alpha-methyl-beta-carboethoxy pyrrolidine
N,N'-thio-bis-pyrrolidine
N,N'-dithio-bis-pyrrolidine
N,N'-trithio-bis-pyrrolidine
N,N'-tetrathio-bis-pyrrolidine Substantially 71.1 parts by weight of pyrrolidine were dissolved in 400 parts by weight of benzene and to the solution so prepared a solution of 26 parts by weight of sulfur dichloride in 50 parts by weight of benzene were gradually added with stirring while keeping the temperature of the reaction mixture in the range of 5–9° C. After the addition the reaction mixture was stirred for a short time longer and the by-product pyrrolidine hydrochloride salt removed by filtration and washed with benzene. The desired product, N,N'-thio-pyrrolidine, a red oil, was obtained as a residue after removal of the solvent.

A solution was prepared comprising 71.1 parts by weight of pyrrolidine in 275 parts by weight of heptane. To this solution there was added slowly with efficient stirring a solution of 34 parts by weight of sulfur monochloride in 35 parts by weight of heptane while keeping the temperature of the reaction mixture within the range of 5–9° C. There was then added 80 parts by weight of 25% aqueous caustic soda. This was followed by the gradual addition over a period of about 20 minutes a solution of 34 parts by weight of sulfur monochloride in 35 parts by weight of heptane concurrently with 80 parts by weight of 25% aqueous caustic soda. After the completion of the reaction the organic layer was separated and washed with water to remove the salt and the solvent removed by distillation. The residue was stripped by heating under vacuum at 95–110° C./5–10 mm. The product was a dark red oil obtained in a yield of 88.3%. It was very soluble in ether and soluble in acetone, alcohol, ethyl acetate, heptane, chloroform and benzene but insoluble in water. Analysis of the crude product gave 33% sulfur and 13% nitrogen as compared to calculated value of 31.4% sulfur and 13.7% nitrogen for N,N'-dithio-bis-pyrrolidine.

N,N'-dithio-pyrrolidine is a very active vulcanizing agent which resembles sulfur in its rate of cure in contrast to the dithio-piperidines and morpholines which are active only at temperatures considerably higher than necessary for vulcanization with sulfur. N,N'-tetrathio-pyrrolidine which may be produced by reacting N,N'-dithio-bis-pyrrolidine with sulfur is an extremely active vulcanizing agent. This preparation is illustrated below.

Substantially 20.4 parts by weight of N,N'-dithio-bis-pyrrolidine and 6.4 parts by weight of sulfur were heated at 115–120° C. for four hours. The reaction mixture was then taken up in ether and filtered. N,N'-tetrathio-pyrrolidine was obtained as a red oil after removal of the solvent.

What is claimed is:

1. An N-thioamine of a compound containing a pyrrolidine nucleus containing the structure

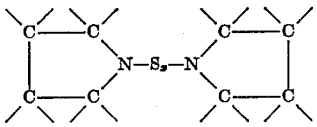

where $x$ is an integer less than five and the valences of the carbon atoms are satisfied by substituents selected from the group consisting of hydrogen, short chain alkyl groups, short chain carbalkoxy groups and chlorine.

2. An N-thioamine of the structure

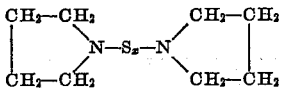

where $x$ is an integer less than five.

3. N,N'-thio-bis-pyrrolidine.
4. N,N'-dithio-bis-pyrrolidine.
5. N,N'-tetrathio-bis-pyrrolidine.
6. N,N'-dithio-bis-alpha-alpha'-dimethyl pyrrolidine.
7. N,N'-dithio-bis-alpha-methyl pyrrolidine.

THOMAS E. LESSLIE.

References Cited in the file of this patent

UNITED STATES PATENTS

| Number | Name | Date |
|---|---|---|
| 1,842,711 | Birchall et al. | Jan. 26, 1942 |
| 2,455,807 | Redmon et al. | Dec. 7, 1948 |